United States Patent
Deeter et al.

(10) Patent No.: US 11,821,143 B2
(45) Date of Patent: *Nov. 21, 2023

(54) AQUEOUS WATER BARRIER COATINGS

(71) Applicant: BASF SE, Ludwigshafen (DE)

(72) Inventors: Gary A Deeter, Livonia, MI (US); Frank Reinhold, Canton, MI (US); Amirpouyan Sardashti, Detroit, MI (US); Andrew Seecharan, Canton, MI (US)

(73) Assignee: BASF SE

(*) Notice: Subject to any disclaimer, the term of this patent is extended or adjusted under 35 U.S.C. 154(b) by 209 days.

This patent is subject to a terminal disclaimer.

(21) Appl. No.: 16/950,415

(22) Filed: Nov. 17, 2020

(65) Prior Publication Data

US 2021/0062428 A1 Mar. 4, 2021

Related U.S. Application Data

(63) Continuation of application No. 16/305,497, filed as application No. PCT/US2017/035754 on Jun. 2, 2017, now Pat. No. 10,961,664.

(Continued)

(51) Int. Cl.
*D21H 21/16* (2006.01)
*C09D 7/45* (2018.01)
(Continued)

(52) U.S. Cl.
CPC ............... *D21H 21/16* (2013.01); *C09D 5/00* (2013.01); *C09D 7/45* (2018.01); *C09D 7/63* (2018.01); *C09D 125/16* (2013.01); *C09D 133/02* (2013.01); *C09D 133/064* (2013.01); *D21H 19/12* (2013.01)

(58) Field of Classification Search
None
See application file for complete search history.

(56) References Cited

U.S. PATENT DOCUMENTS

| 5,487,950 A | 1/1996 | Weber et al. |
| 5,635,279 A | 6/1997 | Ma et al. |

(Continued)

FOREIGN PATENT DOCUMENTS

| CA | 2915829 A1 | 1/2015 |
| CN | 1203245 A | 12/1998 |

OTHER PUBLICATIONS

Laurel Alcohol Ethoxylates, Chamicalland21,[online],retrieved from the Internet, [retrieved Aug. 13, 2020,<URL: http://www.chemicalland21.com/specialtychem/perchem/LAURYL%20ALCOHOL%20ETHOXYLATE.htm> (Year: 2020).*

(Continued)

*Primary Examiner* — Dennis R Cordray
(74) *Attorney, Agent, or Firm* — Faegre Drinker Biddle & Reath LLP

(57) ABSTRACT

Described herein is a multi-phase polymer binder including an aqueous polymer dispersion, an optional hydrophobic emulsion, and an optional surfactant. The polymer binder, when dried, provides a water uptake of less than about 5 g/m²/20 min, a seal strength of at least about 200 Newton/meter (N/m) as measured at 25° C. or at 90° C., and sufficient block resistance to impart no substrate damage.

16 Claims, 9 Drawing Sheets

Related U.S. Application Data

(60) Provisional application No. 62/345,149, filed on Jun. 3, 2016.

(51) Int. Cl.

| | | |
|---|---|---|
| *C09D 7/63* | (2018.01) |
| *C09D 5/00* | (2006.01) |
| *C09D 133/02* | (2006.01) |
| *C09D 133/06* | (2006.01) |
| *C09D 125/16* | (2006.01) |
| *D21H 19/12* | (2006.01) |

(56) References Cited

U.S. PATENT DOCUMENTS

| | | |
|---|---|---|
| 7,285,590 B2 | 10/2007 | Holub et al. |
| 2001/0005734 A1 | 6/2001 | Lau et al. |
| 2005/0107527 A1 | 5/2005 | Holub et al. |
| 2007/0232743 A1 | 10/2007 | Laviolette et al. |
| 2008/0176968 A1 | 7/2008 | Vansumeren et al. |
| 2011/0308751 A1 | 12/2011 | Moncla et al. |
| 2013/0225744 A1 | 8/2013 | Iyer et al. |
| 2015/0218426 A1 | 8/2015 | Clay et al. |

OTHER PUBLICATIONS

Definition of dispersion, HawleyVs Condensed Chemical Dictionary, 14th Ed,2002,John Wiley & Sons, Inc. [online],Retrieved from the Internet,[retrieved Aug. 13, 2020],<URL: https://onlinelibrary.wiley.com/doi/book/10.1002/9780470114735>. (Year: 2002).

European Search Report in EP Patent Application No. 17807600.6, dated Apr. 1, 2020, 3 pages.

International Preliminary Report on Patentability received for PCT Patent Application No. PCT/US17/35754, dated Dec. 13, 2018, 9 pages.

International Search Report and Written Opinion issued in related International Patent Application No. PCT/US2017/035754, dated Sep. 13, 2017.

* cited by examiner

AQUEOUS WATER BARRIER COATINGS

CROSS REFERENCE TO RELATED APPLICATIONS

This application is a continuation of U.S. patent application Ser. No. 16/305,497, filed on Nov. 29, 2018, which is a U.S. National Stage filing of International Patent Application No. PCT/US2017/035754, filed Jun. 2, 2017, which in turn claims priority from U.S. Provisional Patent Application No. 62/345,149, filed Jun. 3, 2016. The contents of each application are incorporated herein by reference in their entirety.

FIELD

The present technology is generally related to water barrier coatings. More specifically, the present technology is related to polymer-based water resistant heat seal lacquers.

SUMMARY

In one aspect, provided herein are multi-phase polymer binders containing an aqueous polymer dispersion present in an amount of about 65 wt % to about 100 wt %; a hydrophobic emulsion from 0 wt % to about 25 wt %; and a surfactant from 0 wt % to about 10 wt %; wherein the polymer binder, when dried, provides a water uptake of less than about 5 g/m$^2$/20 min, a seal strength of at least about 200 Newton/meter (N/m) as measured at 25° C. or at 90° C., and sufficient block resistance to impart no substrate damage. In some embodiments, the aqueous polymer dispersion is present in an amount of about 80 wt % to about 95 wt %. In some embodiments, the hydrophobic emulsion is present in an amount of about 5 wt % to about 10 wt %. In some embodiments, the surfactant is present in an amount of about 1 wt % to about 3 wt %. In some embodiments, the aqueous polymer dispersion contains an acid-rich copolymer present in an amount of about 5 wt % to about 60 wt %; and an acid-free copolymer present in an amount of about 40 wt % to about 95 wt %. In some embodiments, the aqueous polymer dispersion contains an acid-rich copolymer present in an amount of about 35 wt % to about 45 wt %; and an acid-free copolymer present in an amount of about 55 wt % to about 65 wt %. In some embodiments, the acid-rich copolymer comprises carboxylic acid functional monomers in an amount of about 5 wt % to about 25 wt %; styrene in an amount of up to about 70 wt %; and (meth)acrylate monomers in an amount of about 10 wt % to about 90 wt %. In some embodiments, the acid-rich copolymer contains carboxylic acid functional monomers in an amount of about 5 wt % to about 15 wt %; styrene in an amount of about 20 wt % to about 40 wt %; and (meth)acrylate monomers in an amount of about 45 wt % to about 65 wt %. In some embodiments, the acid-free copolymer contains styrene in an amount of up to about 50 wt %; and (meth)acrylate monomers in an amount of about 50 wt % to less than 100 wt %. In some embodiments, the acid-free copolymer contains styrene in an amount of 15 wt % to about 40 wt %; and (meth)acrylate monomers in an amount of about 65 wt % to about 90 wt %. In some embodiments, the hydrophobic emulsion is a wax emulsion. In some embodiments, the wax emulsion contains paraffin, polyethylene, polypropylene, microcrystalline waxes, fluorinated waxes, ethylene and propylene copolymer waxes, or any combination of two or more thereof. In some embodiments, the surfactant is anionic or non-ionic. In some embodiments, the surfactant contains one or more alkyl sulfonates, alkyl benzene sulfonates, alkyl sulfates, alkyl benzene sulfates, phosphates, phosphinates, fatty carboxylates, or any combination of two or more thereof. In some embodiments, the surfactant contains one or more fatty alcohol ethoxylates. In some embodiments, the surfactant contains one or more alkylsulfosuccinate ethoxylates. In some embodiments, the surfactant contains one or more alkylsulfosuccinate ethoxylates and one or more fatty alcohol ethoxylates. In some embodiments, the surfactant contains one or more fatty alcohols having an alkyl chain length of about 12 to about 18 carbons; and a degree of ethoxylation of about 10 to about 80 molar ethylene oxide units.

In another aspect, provided herein are substrates including at least one surface coated with at least one layer containing a multi-phase polymer binder described herein. In some embodiments, the substrate is paper or paperboard.

In another aspect, provided herein are processes for making the multi-phase polymer binder described herein. In some embodiments, the aqueous polymer dispersion is prepared using a free radical emulsion polymerization process. In some embodiments, the hydrophobic emulsion is present during the free radical emulsion polymerization process. In some embodiments, the additive is added to the aqueous polymer dispersion during the free radical emulsion polymerization process.

DETAILED DESCRIPTION

Figure 1:
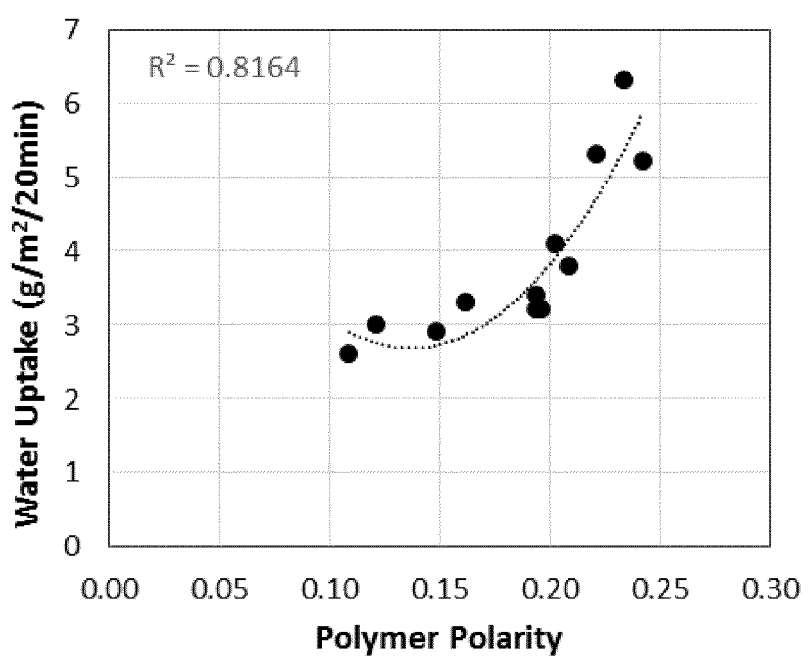
FIG. 1 shows water uptake dependence versus polymer polarity of exemplary polymer binders. Polymer binder details are shown in Tables 2 and 3.

The present disclosure is not to be limited in terms of the particular embodiments described in this application. Many modifications and variations can be made without departing from its spirit and scope, as will be apparent to those skilled in the art. Functionally equivalent methods, formulations, and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used herein is for the purpose of describing particular embodiments only, and is not intended to be limiting.

As used herein, in general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; ethers; urethanes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; enamines; imides; isocyanates; isothiocyanates; cyanates; thiocyanates; imines; nitro groups; nitriles (i.e., CN); and the like.

Alkyl groups, as used herein, include straight chain and branched alkyl groups having from 1 to 20 carbon atoms, and typically from 1 to 12 carbons or, in some embodiments, from 1 to 8, 1 to 6, or 1 to 4 carbon atoms. In some embodiments, alkyl groups include straight chain and/or branched alkyl groups having from 12 to 18 carbons. Alkyl groups further include cycloalkyl groups having 3 to 8 ring members. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. In some embodiments, the branched alkyl groups have at least 8 carbons. Cycloalkyl groups, as used herein, are cyclic alkyl groups such as, but not limited to, cyclopropyl, cyclobutyl, cyclopentyl, cyclohexyl, cycloheptyl, and cyclooctyl groups, and also include bridged cycloalkyl groups. Representative substituted alkyl groups can be unsubstituted or substituted.

In one aspect, disclosed herein is a styrene-acrylic copolymer-based, water-resistant paper coating that demonstrates adhesive properties upon activation by heat and/or pressure. Such a coating may be referred to as a water-resistant heat seal lacquer. Prior to activation, the coating does not adhere to itself or to uncoated paper, a property that is essential to handling and storing the coated paper prior to forming the finished article. This property is referred to as block resistance. A seal is formed when (i) two pieces of coated paper stock or (ii) a piece of coated paper stock and a piece of uncoated paper stock are brought together and exposed to heat and pressure. The ability to form adhesive seals at elevated temperatures is referred to as heat sealability. The seal does not release when exposed to elevated temperatures as defined by the conditions of use. This property is referred to as hot-tack strength. Water resistance is the ability of coated paper to resist/hinder diffusion of water, measured in a specific time under standardized conditions (e.g., 25 C at 50% relative humidity).

Repulpability is the ability of coated paper to undergo the operation of re-wetting and fiberizing for subsequent paper sheet formation. Recyclability is the ability of used treated paper and paperboard to be processed into new paper and paperboard. In some embodiments of a recyclability test, about 70% of untreated virgin pulp is mixed with 30% or lower treated pulp. Sheets are made and compared to sheets of unrecycled virgin pulp In general, heat sealability and block resistance, heat sealability and hot tack strength, and water resistance and recyclability are considered contradictory property sets. For example, polymer properties that deliver heat sealability generally detract from block resistance and hot-tack strength. For instance, the structure variations necessary for heat sealability (e.g., polymer softness) negatively affects block resistance and seal strength. Similarly, recyclability suffers at the expense of water resistance. The development of a water resistant heat seal lacquer that does not negatively impact paper recyclability will likely have a positive effect on the environment by reducing paper waste. The multi-phase polymer binders described herein provide a solution to these contradictory property sets. The state of the art is co-extruded polyethylene coatings, which fulfill many of these requirements, with the exception of paper recyclability and repulpability.

In some embodiments, the paper coatings described herein are multi-phase polymer binders containing an aqueous polymer dispersion, an optional hydrophobic emulsion, and an optional surfactant. In some embodiments, the paper coatings described herein are multi-phase polymer binders containing an aqueous polymer dispersion, an optional hydrophobic emulsion, and an optional surfactant, wherein the polymer binder, when dried, provides a water uptake of less than about 5 g/m$^2$/20 min, a seal strength of at least about 200 Newton/meter (N/m) as measured at 25° C. or at 90° C., and sufficient block resistance to impart no substrate damage. In some embodiments, the block resistance is measured at 50° C. and 60 psi for 24 hours, wherein the polymer binder is coated onto each of two sheets which are layered coating-to-paper (face-to-back, F-B) or coating-to-coating (face-to-face, F-F).

In some embodiments, the multi-phase polymer binder contains an aqueous polymer dispersion present in an amount of about 65 wt % to about 100 wt %; a hydrophobic emulsion from 0 wt % to about 25 wt %; and a surfactant from 0 wt % to about 10 wt %; wherein the polymer binder, when dried, provides a water uptake of less than about 5 g/m$^2$/20 min, a seal strength of at least about 200 Newton/meter (N/m) as measured at 25° C. or at 90° C., and sufficient block resistance to impart no substrate damage.

In some embodiments, the multi-phase polymer binder contains an aqueous polymer dispersion present in an amount of about 65 wt % to less than 100 wt %; a hydrophobic emulsion from 0 wt % to about 25 wt %; and a surfactant from 0 wt % to about 10 wt %; wherein the polymer binder, when dried, provides a water uptake of less than about 5 g/m$^2$/20 min, a seal strength of at least about 200 Newton/meter (N/m) as measured at 25° C. or at 90° C., and sufficient block resistance to impart no substrate damage.

The multi-phase polymer binder includes a polymer dispersion containing a high Tg, carboxylic acid functional styrene-acrylic copolymer phase and a low Tg, hydrophobic styrene-acrylic co-polymer phase. In some embodiments, the high Tg, carboxylic acid phase is prepared using emulsion polymerization in the presence of a free radical initiator, namely ammonium persulfate (APS) and an anionically charged surface active agent (surfactant), namely sodium lauryl sulfate. In some embodiments, the high Tg, carboxylic acid phase is prepared using free radical solution polymerization, isolated and dispersed into water to prepare the water barrier polymer formulation. In some embodiments, the low Tg, hydrophobic phase is prepared in the presence of the high Tg, carboxylic acid functional phase to provide colloidal stability to the polymer dispersion. In some embodiments, the low Tg, hydrophobic phase is prepared by free radical emulsion polymerization in the presence of the high Tg, carboxylic acid functional phase to provide colloidal stability to the polymer dispersion. In further embodiments, a hydrophobic emulsion (e.g., a wax dispersion) is present during the polymerization process. In still further embodiments, a surfactant is added during the polymerization process to increase polymer dispersion stability and the physical properties of the dried coating. In some embodiments, the high Tg, carboxylic acid phase (i.e., acid-rich phase) and the low Tg, hydrophobic phase (i.e., acid-free phase) are separately prepared and blended together to form the polymer dispersion.

The multi-phase polymer binders disclosed herein contain an aqueous polymer dispersion. In some embodiments, the polymer of the aqueous polymer dispersion contains an acid-rich polymer and an acid-free polymer. In some embodiments, the polymer of the aqueous polymer dispersion contains a shell and a core. In some embodiments, the shell contains an acid-rich styrene-acrylic copolymer, and the core contains an acid-free (e.g., hydrophobic) styrene-acrylic copolymer. In some embodiments, the shell consists of an acid-rich styrene-acrylic copolymer, and the core consists of an acid-free (e.g., hydrophobic) styrene-acrylic copolymer.

In some embodiments, the aqueous polymer dispersion contains an acid-rich copolymer present in an amount of about 5 wt % to about 60 wt %; and an acid-free copolymer present in an amount of about 40 wt % to about 95 wt %. This includes about 5 wt % of the acid-rich copolymer and about 95 wt % of the acid-free copolymer, about 10 wt % of the acid-rich copolymer and about 90 wt % of the acid-free copolymer, about 15 wt % of the acid-rich copolymer and about 85 wt % of the acid-free copolymer, about 20 wt % of the acid-rich copolymer and about 80 wt % of the acid-free copolymer, about 25 wt % of the acid-rich copolymer and about 75 wt % of the acid-free copolymer, about 30 wt % of the acid-rich copolymer and about 70 wt % of the acid-free copolymer, about 35 wt % of the acid-rich copolymer and about 65 wt % of the acid-free copolymer, about 40 wt % of the acid-rich copolymer and about 60 wt % of the acid-free copolymer, about 45 wt % of the acid-rich copolymer and about 55 wt % of the acid-free copolymer, about 50 wt % of the acid-rich copolymer and about 50 wt % of the acid-free copolymer, about 55 wt % of the acid-rich copolymer and about 45 wt % of the acid-free copolymer, or about 60 wt % of the acid-rich copolymer and about 40 wt % of the acid-free copolymer. In some embodiments, the aqueous polymer dispersion comprises an acid-rich copolymer present in an amount of about 35 wt % to about 45 wt %; and an acid-free copolymer present in an amount of about 55 wt % to about 65 wt %.

In some embodiments, the aqueous polymer dispersion contains an acid-rich copolymer and acid-free copolymer in a weight ratio of acid-rich copolymer to acid-free copolymer of about 0.5:9.5 to 6:4. This includes a weight ratio of about 3:7 to about 3:2, about 2:3 to about 7:3, 3:7 to about 6:4, or about 3.5:6.5 to 4.5:5.5. In some embodiments, the weight ratio of acid-rich copolymer to acid-free copolymer is at least 3:7. This includes a weight ratio of at least 2:3, 3.5:6.5, 4.5:5.5, or 1:1. In some embodiments, the weight ratio of acid-rich copolymer to acid-free copolymer is about 0.5:9.5, 1:9, 2:8, 3:7, 3.5:6.5, 2:3, 4.5:5.5, 1:1, 5.5:4.5, 3:2, 6.5:3.5, or 7:3, including incremental ratios therein.

The acid-rich styrene-acrylic copolymer may be a carboxylic acid functional styrene-acrylic copolymer. As used herein, "carboxylic acid functional" refers to the presence of at least one carboxylic acid group in the compound. A carboxylic acid functional monomer is a monomer that has at least one carboxylic acid functionality that survives the polymerization process and causes the copolymer to retain such functionality. In some embodiments, the acid-rich styrene-acrylic copolymer contains carboxylic acid functional monomers, styrenic monomers, and (meth)acrylate monomers. In some embodiments, the acid-rich styrene-acrylic copolymer contains carboxylic acid functional monomers, styrene, and (meth)acrylate monomers. In some embodiments, the acid-rich copolymer contains carboxylic acid functional monomers in an amount of about 1 wt % to about 25 wt %; styrene in an amount of up to about 70 wt %; and (meth)acrylate monomers in an amount of about 10 wt % to about 90 wt %. In some embodiments, the acid-rich copolymer contains carboxylic acid functional monomers in an amount of about 5 wt % to about 25 wt %; styrene in an amount of up to about 70 wt %; and (meth)acrylate monomers in an amount of about 10 wt % to about 90 wt %. In some embodiments, the acid-rich copolymer comprises carboxylic acid functional monomers in an amount of about 5 wt % to about 15 wt %; styrene in an amount of about 20 wt % to about 40 wt %; and (meth)acrylate monomers in an amount of about 45 wt % to about 65 wt %.

Illustrative carboxylic acid functional monomers include, but are not limited to, acrylic acid, methacrylic acid, itaconic acid, crotonic acid, maleic acid and fumeric acid. The term "carboxylic acid functional monomers" also includes the anhydride derivatives of the carboxylic acid functional monomers listed above. The carboxylic acid functional monomers may include one, two, three, four, or more, different carboxylic acid functional monomers.

In some embodiments, the acid-rich phase includes one or more other unsaturated monomers. Illustrative other unsaturated monomers include, but are not limited to, vinyl ethers (such as methyl vinyl ether, ethyl vinyl ether, butyl vinyl ether, and vinyl ethers with longer carbon-chain lengths), vinyl esters (such as vinyl acetate and esters based on versatic acid), and 1,3-alkenes (such as butadiene).

In some embodiments, the acid-rich phase includes one or more chain transfer agents to control molecular weight, branching and/or gel formation. Exemplary chain transfer agents include, but are not limited to, isooctyl mercaptopropionate (IOMPA), butylmercaptopropionate, 2-ethyl hexylmercaptopropionate, tertiary dodecylmercaptan, and thioglycerol.

The acid-rich styrene-acrylic copolymer exhibits a high glass transition temperature ($T_g$). In some embodiments, the $T_g$ is at least about 55° C. This includes a $T_g$ of at least about 60° C., a $T_g$ of at least about 65° C., a $T_g$ of at least about 70° C., a $T_g$ of at least about 75° C., a $T_g$ of at least about 80° C., a $T_g$ of at least about 85° C., a $T_g$ of at least about 90° C., a $T_g$ of at least about 95° C., a $T_g$ of at least about 100° C., a $T_g$ of at least about 105° C., a $T_g$ of at least about 110° C., a $T_g$ of at least about 115° C., a $T_g$ of at least about 120° C., or a $T_g$ of at least about 125° C. In some embodiments, the $T_g$ is from about 55° C. to about 130° C. This includes a $T_g$ of from about 55° C. to about 125° C., about 60° C. to about 125° C., about 65° C. to about 125° C., about 70° C. to about 125° C., about 75° C. to about 125° C., about 80° C. to about 125° C., about 85° C. to about 125° C., about 60° C. to about 120° C., about 70° C. to about 120° C., about 75° C. to about 120° C., about 80° C. to about 120° C., about 55° C. to about 110° C., about 60° C. to about 110° C., about 65° C. to about 110° C., about 70° C. to about 110° C., about 75° C. to about 110° C., about 80° C. to about 110° C., about 55° C. to about 100° C., about 60° C. to about 100° C., about 65° C. to about 100° C., about 70° C. to about 100° C., about 75° C. to about 100° C., about 55° C. to about 90° C., about 60° C. to about 90° C., about 65° C. to about 90° C., about 70° C. to about 90° C., about 75° C. to about 90° C., about 75° C. to about 90° C., about 55° C. to about 85° C., about 60° C. to about 85° C., about 65° C. to about 85° C., or about 70° C. to about 85° C. In some embodiments, the $T_g$ is about 55, 60, 65, 70, 75, 80, 85, 90, 95, 100, 105, 110, 115, 120, 125, or 130° C., including increments therein.

In some embodiments, the acid-rich styrene-acrylic copolymer shell is prepared using emulsion polymerization in the presence of a free radical initiator and an anionically charged surface active agent. In some embodiments, the free radical initiator is ammonium persulfate (APS), potassium peroxydisulfide, sodium peroxydisulfide, ammonium peroxydisulfide, or a water- and oil-soluble substituted azonitrile. In some embodiments, the anionically charged surface active agent is sodium lauryl sulfate. In some embodiments, the acid-rich styrene-acrylic copolymer shell is prepared using redox-initiated polymerization. Illustrative oxidants include, but are not limited to, peroxydisulfate salts and organic peroxides. Illustrative reductants include, but are not limited to, ascorbic acid, iso-ascorbic acid and sodium erythrobate and sulfur-based reducing agents such as sodium formaldehyde sulfoxide, sodium sulfite and other functional sulfonate derivatives.

In some embodiments, the shell is prepared using free radical solution polymerization, isolated and dispersed into water to prepare the water barrier polymer formulation. In some embodiments, the free radical solution polymerization is a high temperature continuous process.

An acid-free styrene-acrylic copolymer is not a carboxylic acid functional styrene-acrylic copolymer nor does it contain carboxylic acid functional monomers. In some embodiments, the acid-free copolymer comprises styrene in an amount of up to about 50 wt %; and (meth)acrylate monomers in an amount of about 50 wt % to less than 100 wt %. In some embodiments, the acid-free copolymer comprises styrene in an amount of 15 wt % to about 40 wt %; and (meth)acrylate monomers in an amount of about 65 wt % to about 90 wt %.

The acid-free styrene-acrylic copolymer exhibits a low glass transition temperature ($T_g$). In some embodiments, the $T_g$ is from about −40° C. to about 40° C. This includes a $T_g$ of from about −30° C. to about 40° C., about −20° C. to about 40° C., about −10° C. to about 40° C., about 0° C. to about 40° C., −40° C. to about 30° C., −30° C. to about 30° C., about −20° C. to about 30° C., about −10° C. to about 30° C., about 0° C. to about 30° C., −40° C. to about 20° C., −30° C. to about 20° C., about −20° C. to about 20° C., about −10° C. to about 20° C., about 0° C. to about 20° C., −40° C. to about 10° C., −30° C. to about 10° C., about −20° C. to about 10° C., about −10° C. to about 10° C., about 0° C. to about 10° C., −40° C. to about 0° C., −30° C. to about 0° C., about −20° C. to about 0° C., or about −10° C. to about 0° C. In some embodiments, the $T_g$ is about −40, −39, −38, −37, −36, −35, −34, −33, −32, −31, −30, −29, −28, −27, −26, −25, −24, −23, −22, −21, −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40° C., including increments therein.

Suitable styrenic monomers for use in the styrene-acrylic copolymer include those having a substituted or unsubstituted phenyl group attached to an ethylene moiety. Styrenic monomers include, but are not limited to, styrene and α-methylstyrene, and combinations thereof. Suitable styrenic monomers include, but are not limited to, styrene, α-methylstyrene, p-methylstyrene, t-butylstyrene, o-chlorostyrene, vinyl pyridine, and mixtures of these species. In some embodiments, the styrenic monomers include styrene and α-methyl-styrene. In some embodiments, the styrenic monomer is styrene.

In some embodiments, the (meth)acrylate monomers include alkyl (meth)acrylate monomers. A mixture of $C_1$-$C_4$ alkyl(meth)acrylates and $C_5$-$C_{12}$ alkyl(meth)acrylates may be used. $C_1$-$C_4$ alkyl(meth)acrylates, include compounds such as methyl (meth)acrylate, ethyl (meth)acrylate, n-propyl (meth)acrylate, iso-propyl (meth)acrylate), n-butyl (meth)acrylate), iso-butyl (meth)acrylate, tert-butyl (meth) acrylate, and any mixtures of any two or more. $C_5$-$C_{12}$ alkyl(meth)acrylates, may include compounds such as pentyl (meth)acrylate, hexyl (meth)acrylate, heptyl (meth)acrylate, octyl (meth)acrylate, nonyl (meth)acrylate), decyl (meth)acrylate), undeca (meth)acrylate, dodecyl (meth) acrylate, a mixture of any two or more such compounds, and any of the various alkyl isomers thereof. For example, the alkyl isomers of "pentyl" (meth)acrylate include n-pentyl, iso-pentyl, neo-pentyl, sec-pentyl, etc.

In some embodiments, the aqueous polymer dispersion is present in the multi-phase polymer binder in an amount of about 65 wt % to equal to or less than 100 wt %. In some embodiments, the aqueous polymer dispersion is present in the multi-phase polymer binder in an amount of about 65 wt % to less than 100 wt %. This includes where the amount is about 65 wt % to about 99 wt %; about 65 wt % to about 95 wt %; about 65 wt % to about 90 wt %; about 65 wt % to about 85 wt %; about 65 wt % to about 80 wt %; about 70 wt % to about 99 wt %; about 70 wt % to about 95 wt %; about 70 wt % to about 90 wt %; about 70 wt % to about 85 wt %; about 70 wt % to about 80 wt %; about 75 wt % to about 99 wt %; about 75 wt % to about 95 wt %; about 75 wt % to about 90 wt %; about 75 wt % to about 85 wt %; about 75 wt % to about 80 wt %; about 80 wt % to about 99 wt %; about 80 wt % to about 95 wt %; about 80 wt % to about 90 wt %; about 80 wt % to about 85 wt %; about 85 wt % to about 99 wt %; about 85 wt % to about 95 wt %; or about 85 wt % to about 90 wt %. In some embodiments, the aqueous polymer dispersion is present in the multi-phase polymer binder in an amount of about 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %, including increments therein.

The multi-phase polymer binder described herein may contain a hydrophobic emulsion. In some embodiments, the hydrophobic emulsion is present in the multi-phase polymer binder in an amount of from 0 wt % to about 25 wt %. This includes where the amount is from 0 wt % to about 20 wt %; from 0 wt % to about 15 wt %; from 0 wt % to about 10 wt %; from 0 wt % to about 5 wt %; about 1 wt % to about 25 wt %; about 1 wt % to about 20 wt %; about 1 wt % to about 15 wt %; about 1 wt % to about 10 wt %; about 5 wt % to about 25 wt %; about 5 wt % to about 20 wt %; about 5 wt % to about 15 wt %; about 5 wt % to about 10 wt %; about 10 wt % to about 25 wt %; about 10 wt % to about 20 wt %; or about 10 wt % to about 15 wt %. In some embodiments, the hydrophobic emulsion is present in the multi-phase polymer binder in an amount of 0, 1, 2, 3, 4, 5, 6, 7, 8, 9, 10, 11, 12, 13, 14, 15, 16, 17, 18, 19, 20, 21, 22, 23, 24, or 25 wt %, including increments therein. In some embodiments, the hydrophobic emulsion is present in the multi-phase polymer binder in an amount of about 1, 2, 3, 4, 5, 6, 7, 8, 9, 10, 11, 12, 13, 14, 15, 16, 17, 18, 19, 20, 21, 22, 23, 24, or 25 wt %, including increments therein.

In some embodiments, the hydrophobic emulsion is at least 1% based on polymer solids. This includes 1, 2, 3, 4, 5, 6, 7, 8, 9, 10, 11, 12, 13, 14, 15, 16, 17, 18, 19, 20, 21, 22, 23, 24, or 25% based on polymer solids, including increments therein. In some embodiments, the hydrophobic emulsion may have a solids content from about 15 to about 60 wt %. In other embodiments, the hydrophobic emulsion may have a solids content from about 25 to 40 wt %. As a non-limiting illustration, for resin solutions having a solids content from about 15 to about 60 wt %, the pH may range from about neutral to 9.5 and have a Brookfield viscosity from 35 to 6,000 cps.

In some embodiments, the hydrophobic emulsion includes a wax dispersion. In some embodiments, the hydrophobic emulsion is a wax dispersion or wax emulsion. In some embodiments, the wax emulsion contains paraffin, polyethylene, polypropylene, microcrystalline waxes, fluorinated waxes, ethylene and propylene copolymer waxes, or any combination of two or more thereof. Illustrative hydrophobic emulsions include, but are not limited to, paraffin/polyethylene wax emulsions, anionic paraffin/polyethylene wax emulsions, paraffin wax emulsions, ethoxylated paraffin wax emulsions, and paraffin wax emulsions dispersed with a surfactant. Exemplary hydrophobic emulsions include, but are not limited to, JONCRYL® Wax 120, PETROLITE™ D-800, MICHEM® 62330, PETROLITE™ D-1038, JONCRYL® Wax 26, UNITHOX™ D-300, UNITHOX™ D-550, and UNITHOX™ 75.

The multi-phase polymer binder described herein may contain a surfactant. In some embodiments, the surfactant is anionic or non-ionic. In some embodiments, the surfactant contains one or more fatty alcohol alkoxylates. In further embodiments, the one or more fatty alcohol alkoxylates are fatty alcohol ethoxylates, fatty alcohol propoxylates, or any combination thereof. In some embodiments, the surfactant contains one or more ethylene oxide/propylene oxide block copolymers. In some embodiments, the surfactant contains one or more fatty alcohol ethoxylates. In some embodiments, the surfactant contains one or more alkylsulfosuccinate ethoxylates. In some embodiments, the surfactant contains one or more fatty alcohols having an alkyl chain length of about 12 to about 18 carbons; and a degree of ethoxylation of about 10 to about 80 molar ethylene oxide units. In some embodiments, the surfactant includes non-ionic surfactants. In some embodiments, the surfactant includes anionic surfactants. In some embodiments, the anionic surfactant includes one or more alkyl sulfonates, alkyl benzene sulfonates, alkyl sulfates, alkyl benzene sulfates, phosphates, phosphinates, fatty carboxylates, or any combination of two or more thereof.

In some embodiments, the surfactant is present in the multi-phase polymer binder in an amount from 0 wt % to about 10 wt %. This includes where the amount is from 0 wt % to about 9 wt %; from 0 wt % to about 8 wt %; from 0 wt % to about 7 wt %; from 0 wt % to about 6 wt %; from 0 wt % to about 5 wt %; from 0 wt % to about 4 wt %; from 0 wt % to about 3 wt %; from 0 wt % to about 2 wt %; from 0 wt % to about 1 wt %; about 1 wt % to about 10 wt %; about 1 wt % to about 9 wt %; about 1 wt % to about 8 wt %; about 1 wt % to about 7 wt %; about 1 wt % to about 6 wt %; about 1 wt % to about 5 wt %; about 1 wt % to about 4 wt %; about 1 wt % to about 3 wt %; about 1 wt % to about 2 wt %; about 2 wt % to about 10 wt %; about 2 wt % to about 9 wt %; about 2 wt % to about 8 wt %; about 2 wt % to about 7 wt %; about 2 wt % to about 6 wt %; about 2 wt % to about 5 wt %; about 2 wt % to about 4 wt %; about 2 wt % to about 3 wt %; about 3 wt % to about 10 wt %; about 3 wt % to about 9 wt %; about 3 wt % to about 8 wt %; about 3 wt % to about 7 wt %; about 3 wt % to about 6 wt %; about 3 wt % to about 5 wt %; about 3 wt % to about 4 wt %; about 5 wt % to about 10 wt %; about 5 wt % to about 9 wt %; about 5 wt % to about 8 wt %; about 5 wt % to about 7 wt %; or about 5 wt % to about 6 wt %. In some embodiments, the surfactant is present in the multi-phase polymer binder in an amount from 0, 1, 2, 3, 4, 5, 6, 7, 8, 9, or 10 wt %, including increments therein. In some embodiments, the surfactant is present in the multi-phase polymer binder in an amount of about 1, 2, 3, 4, 5, 6, 7, 8, 9, or 10 wt %, including increments therein.

The resins solution may have a solids content from about 15 wt % to about 60 wt %, with a pH of from 7.0 to 9.5, and a Brookfield viscosity from 35 to 6,000 cps. This may include a solids content from about 30 wt % to about 40 wt %, with a pH of from 8.0 to 9.0, and a Brookfield viscosity from 2,500 to 4,000 cps.

The multi-phase polymer binder described herein may contain other materials such as, but not limited to, other aqueous resin solutions, rheology modifiers, wetting agents, defoamers, and fillers. Illustrative other aqueous resin solutions include carboxylic acid-rich copolymers that may be incorporated from 0 to about 20 wt % or from >0 to about 20 wt %. Such carboxylic acid-rich copolymers may include copolymers of carboxylic acid functional monomers, styrene, and (meth)acrylate monomers. For example, the carboxylic acid-rich copolymers may include from 5 to 25 wt % carboxylic acid functional monomers, up to about 70 wt % styrene, and from 10 to 90 wt % (meth)acrylate monomers. Illustrative rheology modifiers include, but are not limited to, hydrophobically modified ethoxylated urethanes, hydrophobically modified polyethers, alkali swellable emulsions; hydrophobically modified alkali swellable emulsions, clays, and fumed silica. The rheology modifiers may be used in the formulations from 0 to about 2 wt % or from >0 to about 2 wt %. Illustrative wetting agents include, but are not limited to alkoxylated surfactants (i.e. di-functional block copolymer surfactants terminating in primary hydroxyl groups or polyethylene glycol and/or propylene glycols) silicone surfactants, sulfosuccinate surfactants, and star shaped alkoxylated polymers. The wetting agents may be used in the formulations from 0 to about 4 wt % or from >0 to about 4 wt %. Illustrative defoamers include, but are not limited to oil-based defoamers (i.e. mineral oil, vegetable oil, or white oils), silicon-based defoamers (i.e. polydimethylsiloxane and derivatives thereof), aqueous emulsion based defoamers, aqueous defoamer emulsions based on oils, polymers and organo-modified silicones, polyethylene glycol and/or propylene glycols, and star shaped polymers. The defoamers may be used in the formulations from 0 to about 0.5 wt % or from >0 to about 0.5 wt %. Illustrative fillers include, but are not limited fumed silica, clay materials (i.e. exfoliated or non-exfoliated kaolins, talc, attapulgites, montmorillonite, bentonite, hectorite and saponite), calcium carbonate, natural mica, and combinations of any two or more thereof. The fillers may be used in the formulations from 0 to about 40 wt % or from >0 to about 40 wt %.

When coated on a substrate and dried, the polymer binders described herein provide a water uptake of less than about 5 g/m$^2$/20 min. This includes a water uptake of less than about 4.5 g/m$^2$/20 min, a water uptake of less than about 4 g/m$^2$/20 min, a water uptake of less than about 3.5 g/m$^2$/20 min, a water uptake of less than about 3 g/m$^2$/20 min, a water uptake of less than about 2.5 g/m$^2$/20 min, a water uptake of less than about 2 g/m$^2$/20 min, or a water uptake of less than about 1 g/m$^2$/20 min. In some embodiments, the water uptake is about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 g/m$^2$/20 min, including increments therein. In some embodiments, the water uptake is from about 0.5 to about 5.0 g/m$^2$/20 min. This includes a water uptake of from about 0.5 to about 4.5 g/m$^2$/20 min, from about 0.5 to about 4.0 g/m$^2$/20 min, from about 0.5 to about 3.5 g/m$^2$/20 min, from about 0.5 to about 3.0 g/m$^2$/20 min, from about 0.5 to about 2.5 g/m$^2$/20 min, from about 0.5 to about 2.0 g/m$^2$/20 min, from about 1.0 to about 5.0 g/m$^2$/20 min, from about 1.0 to about 4.5 g/m$^2$/20 min, from about 1.0 to about 4.0 g/m$^2$/20 min, from about 1.0 to about 3.5 g/m$^2$/20 min, from about 1.0 to about 3.0 g/m$^2$/20 min, or from about 1.0 to about 2.5 g/m$^2$/20 min.

When coated on a substrate and dried, the polymer binders described herein provide a seal strength of at least about 200 Newton/meter (N/m) as measured at about −15° C. to about 90° C. This includes a seal strength of about 200, 225, 250, 275, 300, 325, 350, 375, 400, 425, 450, 475, 500, 525, 550, 575, or 600 N/m, including increments therein, as measured at about −15° C. to 25° C. In some embodiments, the polymer binder provides a seal strength of about 200 N/m to about 600 N/m at about −15° C. to 25° C. as measured by a 180-degree peel test. This includes a seal strength of about 200 N/m to about 500 N/m, about 200 N/m to about 400 N/m, about 250 N/m to about 600 N/m, or about 250 N/m to about 500 N/m at about −15° C. to 25° C. as measured by a 180-degree peel test. In some embodiments, the polymer binder provides a seal strength of about 200 N/m to about 450 N/m at about 90° C. as measured by a 180-degree peel test. This includes a seal strength of about 200, 225, 250, 275, 300, 325, 350, 375, 400, 425, or 450 N/m, including increments therein, at about 90° C. as measured by a 180-degree peel test. In some embodiments, the polymer binder provides a seal strength of at least about 200 Newton/meter (N/m) as measured at about 25° C. or at about 90° C.

When coated on a substrate and dried, the polymer binders described herein provide sufficient block resistance to impart no substrate damage. As used herein, "sufficient block resistance" refers to a score of 3 or more in the rating system described in Example 8. In some embodiments, sufficient block resistance refers to a rating of 4 or more according to the rating system described in Example 8. In some embodiments, sufficient block resistance refers to a rating of 5 according to the rating system described in Example 8. In some embodiments, presence of substrate damage is assessed by the naked eye. In some embodiments, "no substrate damage" refers to no substrate damage as observed by the naked eye.

When coated on a substrate and dried, then top coated with an ink formulation, the polymer binders described herein which contain a hydrophobic emulsion provide no more than a 50% decrease in color density compared to a comparative polymer binder without a hydrophobic emulsion. This includes no more than a 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, or 0.5% decrease in color density, including increments therein. In some embodiments, the polymer binder containing a hydrophobic emulsion provides a 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, 0.3, 0.2, or 0.1% decrease in color density, including increments therein, compared to a comparative polymer binder without a hydrophobic emulsion. The color density is related to the amount of ink applied to a printing substrate.

When coated on a substrate and dried, the polymer binders described herein provide a final coat weight of at least about 8 g/m$^2$. This includes about 9, 10, 11, 12, 13, 14, 15, 16, 17, 18, or 19 g/m$^2$. In some embodiments, the final coat weight is between about 10 to about 20 g/m$^2$.

When coated on a substrate and dried, the polymer binders described herein provide a final coat thickness of at least about 8 microns. This includes about 9, 10, 11, 12, 13, 14, 15, 16, 17, 18, or 19 microns. In some embodiments, the final coat thickness is between about 10 to about 20 microns.

In another aspect, provided herein are substrates containing at least one surface coated with at least one layer including a multi-phase polymer binder disclosed herein. In some embodiments, the substrate contains at least one surface coated with a single layer including a multi-phase polymer binder disclosed herein. In some embodiments, the substrate contains at least one surface coated with more than one layer including a multi-phase polymer binder disclosed herein. In some embodiments, the substrate is paper or paperboard. In some embodiments, the substrate is paper. In some embodiments, the substrate is paperboard.

In another aspect, provided herein are processes for making the multi-phase polymer binder disclosed herein. In some embodiments, the aqueous polymer dispersion is prepared using an aqueous multi-phase polymerization. In some embodiments, the aqueous polymer dispersion is prepared using a free radical emulsion polymerization process. In some embodiments, the hydrophobic emulsion is added to the aqueous polymer dispersion before or during the free radical emulsion polymerization process. In some embodiments, the additive is added to the aqueous polymer dispersion during the free radical emulsion polymerization process. In some embodiments, the acid-free copolymer is prepared in the presence of the acid-rich copolymer. In some embodiments, the aqueous polymer dispersion is prepared using a dispersion or suspension polymerization.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present embodiments, thus generally described, will be understood more readily by reference to the following examples, which are provided by way of illustration and are not intended to be limiting of the present technology in any way.

EXAMPLES

Example 1. Preparation of Exemplary Acid-Rich Copolymer

Monomers were first weighed out in appropriate amounts and mixed with a solvent to form a clear solution (Table 1).

A free radical initiator was added to the mixture and mixed until the entire solution was clear. The solution was then fed to a continuous stirred tank reactor operated at a desired temperature and product continuously withdrawn so as to maintain an appropriate residence time in the reactor. The product from the reactor was continuously charged to an evaporator operating at elevated temperature and under vacuum to remove unreacted monomer and solvent from the resin product. The resin product was then analyzed for molecular weight, glass transition temperature and acid value. The composition of the polymer was estimated by either assuming it was identical to the composition of the monomers in the feed, or by mass balance on the individual monomers fed to the reactor. Polarity was calculated from the computed polymer composition.

TABLE 1

High Tg, carboxylic acid functional co-polymer phase

| | Copolymer | | |
|---|---|---|---|
| | A | B | C |
| STY* | 31.4 | 17.5 | 14.0 |
| AMS* | 30.0 | 0.0 | 39.5 |
| MMA* | 0.0 | 41.7 | 0.0 |
| AA* | 31.8 | 8.8 | 18.7 |
| BA* | 0.0 | 17.8 | 24.1 |
| Hexanol* | 6.8 | 0.0 | 0.0 |
| IPA* | 0.0 | 14.2 | 0.0 |
| Carbitol* | 0.0 | 0.0 | 3.7 |
| Mw | 9700 | 11100 | 6900 |
| AN | 228 | 72 | 140 |
| Tg | 133 | 57 | 70 |
| Polarity | 0.148 | 0.248 | 0.156 |

*Weight percent listed.
Abbreviations: STY: styrene; AMS: α-methyl styrene; MMA: methyl methacrylate; AA: acrylic acid; BA: butyl acrylate; IPA: isopropanol; Mw: weight average molecular weight; AN: acid number reported as mg KOH/g of resin; Tg: glass transition temperature (° C.).

Example 2. Exemplary Procedure to Make an Aqueous Solution from an Acid-Rich Styrene, Acrylic Polymer Deionized water (554.4 g) and Resin A (Table 1; 240.4 g) were charged into a 1 L reactor. An ammonia solution (28% solution in water, 55.3 g) was added to the reactor with stirring at room temperature. The reactor was heated to a temperature of 85° C. and stirred for 5 hours. The solution was then cooled to room temperature and filtered to produce Resin Solution D (shown in Table 2). Resin Solutions E and F were made analogously using Resins B and C, respectively, from Table 1.

TABLE 2

Characterization of exemplary aqueous solutions

| Solution | D | E | F |
|---|---|---|---|
| Resin | A | B | C |
| NV (%) | 28.4 | 26.2 | 28.1 |
| pH | 8.0 | 8.6 | 8.4 |

NV: solids content of aqueous resin solution

Example 3. Emulsion Polymerization Using an Acid-Rich Styrene, Acrylic Polymer

Deionized water (88.27 g), Resin Solution D (Table 2; 286.81 g) and ammonium hydroxide (1.46 g), were charged into a 1-L reactor and heated to 82° C. with stirring. Ammonium persulfate (2.06 g) was added with water (11.15 g). A solution of methyl methacrylate (52.79 g), 2-ethylhexyl acrylate (77.13 g), and butyl acrylate (120.33 g) was fed slowly into the reactor over 90 minutes. Water (2.78 g) was added and the reaction was held for 30 minutes at 82° C. Tertiary butyl peroxide (1.23 g) was added to the reactor and held for 5 minutes. A solution of sodium erythorbate (0.53 g) and water (15.81 g) was fed to the reactor over 30 minutes. Water was added to the reactor (2.92 g). A solution of ammonium hydroxide (1.34 g) and water (35.40 g) was added. The reactor was cooled to room temperature, filtered and isolated as Emulsion G (Table 3). Emulsion H was prepared using 70 wt % Resin Solution D and 30 wt % Resin Solution E. Emulsion I was prepared using 70 wt % Resin Solution D and 30 wt % Resin Solution F. Characterization data for these emulsions are presented in Table 3.

TABLE 3

Characterization of exemplary emulsions

| | Emulsion | | |
|---|---|---|---|
| | G | H | I |
| 1 | D | D | D |
| 2 | — | E | F |
| 1 | 100 | 70 | 70 |
| 2 | — | 30 | 30 |
| % Resin | 25 | 25 | 25 |
| pH | 8.0 | 8.3 | 8.2 |
| Visc. | 2,100 | 2,000 | 2,100 |
| NV (%) | 47.5 | 47.6 | 47.5 |

% Resin: Weight percent high Tg, carboxylic acid copolymer based on total polymer solids; Visc.: Brookfield viscosity (cps); NV: solids content of aqueous resin solution Example 4. Preparation of Exemplary Multi-Phase Polymer Binder Deionized water (468.5 g) and a 30% active sodium lauryl sulfate solution (10.0 g) were charged into a 1.5-L reactor and heated to 82° C. with stirring. Ammonium persulfate (2.0 g) was added with water (8.0 g) and held for 5 minutes. Water (4.2 g) was added, and a solution of styrene (62.0 g), methyl methacrylate (72.0 g), methacrylic acid (18.0 g) and isooctyl mercaptopropionate (8.0 g) was fed slowly into the reactor over 60 minutes. Water (10.4 g) was added and the reaction was held for 20 minutes at 82° C. A solution of 2-ethyl hexylacrylate (72.0 g), butyl acrylate (12.0 g), styrene (48.0 g) and iso-butyl methacrylate (108.0 g) was fed slowly into the reactor over 60 minutes, and water (10.4 g) was added. When 33% of the monomer feed was added, a 28% ammonium solution (5.80 g) and water (6.50 g) were added. Water (4.2 g) was added. When 66% of the monomer was added, a 28% ammonium solution (5.80 g) and water (6.50 g) were added. Water (20.9 g) was added. The reaction was held at 82° C. for 45 minutes after which it was cooled to 50° C. A biocide (2.0 g) and water (27.1 g) solution was added. Water (11.8 g) was added. The reaction was cooled to room temperature, filtering and isolated as multi-phase polymer binder I.D. No. 1. Additional details for this polymer binder and analogous polymer binders are presented in Table 4.

TABLE 4

Exemplary multi-phase polymer binder compositions

| | Acid-Rich Phase Monomer* | | | | | | Acid-Free Phase Monomers* | | | | | |
|---|---|---|---|---|---|---|---|---|---|---|---|---|
| I.D. | MMA | 2-EHA | STY | MAA | iBMA | IOMPA | 2-EHA | STY | nBA | iBMA | Polarity | Hardness |
| 1 | 45.0 | 0.0 | 38.8 | 11.3 | 0.0 | 5.0 | 30.0 | 20.0 | 5.0 | 45.0 | 0.177 | 42.0 |
| 2 | 45.0 | 14.5 | 24.3 | 11.3 | 0.0 | 5.0 | 34.0 | 16.0 | 20.0 | 30.0 | 0.194 | 16.7 |
| 3 | 45.0 | 28.5 | 10.3 | 11.3 | 0.0 | 5.0 | 49.0 | 3.0 | 29.0 | 19.0 | 0.218 | −10.6 |
| 4 | 45.0 | 14.5 | 24.3 | 11.3 | 0.0 | 5.0 | 34.0 | 16.0 | 20.0 | 30.0 | 0.194 | 16.7 |
| 5 | 45.0 | 0.0 | 38.8 | 11.3 | 0.0 | 5.0 | 49.0 | 3.0 | 29.0 | 19.0 | 0.198 | 6.5 |
| 6 | 45.0 | 28.5 | 10.3 | 11.3 | 0.0 | 5.0 | 30.0 | 20.0 | 5.0 | 45.0 | 0.197 | 20.5 |
| 7 | 59.5 | 0.0 | 0.0 | 11.3 | 24.3 | 5.0 | 30.0 | 20.0 | 5.0 | 45.0 | 0.218 | 38.7 |
| 8 | 53.3 | 30.5 | 0.0 | 11.3 | 0.0 | 5.0 | 49.0 | 3.0 | 29.0 | 19.0 | 0.230 | −11.5 |
| 9 | 53.3 | 30.5 | 0.0 | 11.3 | 0.0 | 5.0 | 30.0 | 20.0 | 5.0 | 45.0 | 0.209 | 19.4 |
| 10 | 59.5 | 0.0 | 0.0 | 11.3 | 24.3 | 5.0 | 49.0 | 3.0 | 29.0 | 19.0 | 0.239 | 3.8 |
| 11 | 45.0 | 5.0 | 33.8 | 11.3 | 0.0 | 5.0 | 34.0 | 36.0 | 30.0 | 0.0 | 0.162 | 21.3 |
| 12 | 45.0 | 5.0 | 33.8 | 11.3 | 0.0 | 5.0 | 65.0 | 35.0 | 0.0 | 0.0 | 0.149 | 14.1 |
| 13 | 14.0 | 5.0 | 64.8 | 11.3 | 0.0 | 5.0 | 34.0 | 36.0 | 30.0 | 0.0 | 0.122 | 20.2 |
| 14 | 14.0 | 5.0 | 64.8 | 11.3 | 0.0 | 5.0 | 65.0 | 35.0 | 0.0 | 0.0 | 0.109 | 13.1 |
| 15 | 45.0 | 4.5 | 34.3 | 11.3 | 0.0 | 5.0 | 30.0 | 20.0 | 30.0 | 20.0 | 0.184 | 21.6 |
| 16 | 11.0 | 0.0 | 33.8 | 11.3 | 39.0 | 5.0 | 30.0 | 20.0 | 30.0 | 20.0 | 0.173 | 18.0 |

*Abbreviations:
MMA = methyl methacrylate;
2-EHA = 2-ethylhexyl acrylate;
STY = styrene;
MAA = methacrylic acid;
IOMPA = isooctyl ester of mercaptopropionic acid;
iBMA = isobutyl methacrylate;
nBA = n-butyl acrylate

Example 5. Assessment of Water Uptake for Multi-Phase Polymer Dispersions

Water resistance of exemplary polymer binders was measured using a Cobb test. The Cobb test measures how much water is absorbed into the paper substrate. An area of 100 cm$^2$ was cut from the coated sample, weighed and secured in a Cobb testing apparatus. DI water (50 mL) was added to the setup and a timer was set for 20 minutes. When the test was complete, the water was poured out and the sampled loosened from the Cobb apparatus. The sample was pat dried and weighed again. The resultant data output (shown in Table 5) was expressed as grams of water absorbed per meter square of coating over a 20 minute time period (g/m$^2$/20 min). FIG. 1 shows the water uptake dependence on total polymer polarity. Water uptake between 2 and 3 g/m$^2$/20 min was achieved.

TABLE 5

Exemplary multi-phase polymer binder water uptake.

| I.D. | Polarity | Hardness (° C.) | Water Uptake (g/m$^2$/20 min) |
|---|---|---|---|
| 2 | 0.194 | 16.7 | 3.2 |
| 3 | 0.218 | −10.6 | 5.3 |
| 4 | 0.194 | 16.7 | 3.4 |
| 5 | 0.198 | 6.5 | 4.1 |
| 6 | 0.197 | 20.5 | 3.2 |
| 8 | 0.230 | −11.5 | 6.3 |
| 9 | 0.209 | 19.4 | 3.8 |
| 10 | 0.239 | 3.8 | 5.2 |
| 11 | 0.162 | 21.3 | 3.3 |
| 12 | 0.149 | 14.1 | 2.9 |
| 13 | 0.122 | 20.2 | 3.0 |
| 14 | 0.109 | 13.1 | 2.6 |

Figure 2:
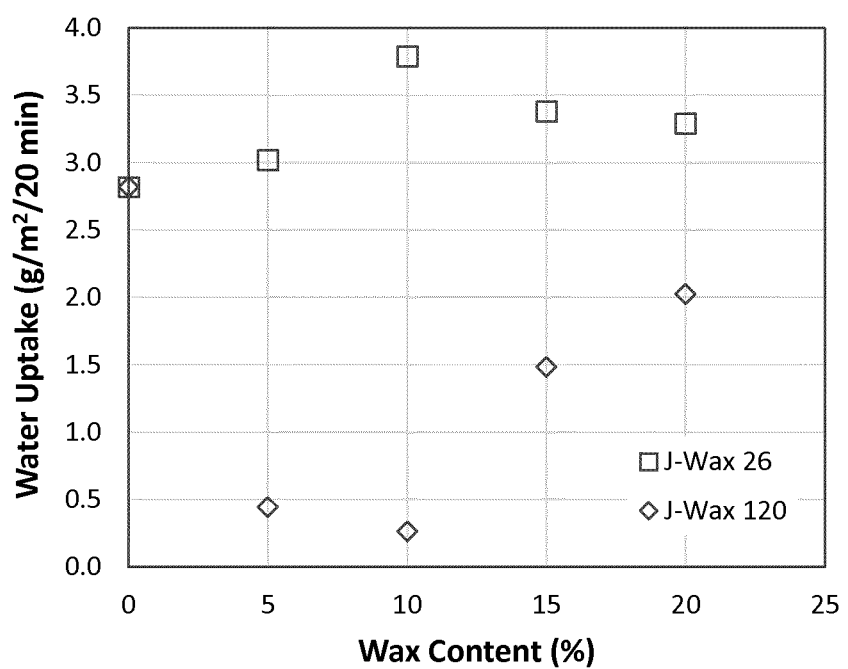
FIG. 2 shows water uptake dependence versus amount of hydrophobic emulsion additive for exemplary polymer binders.
Figure 3:
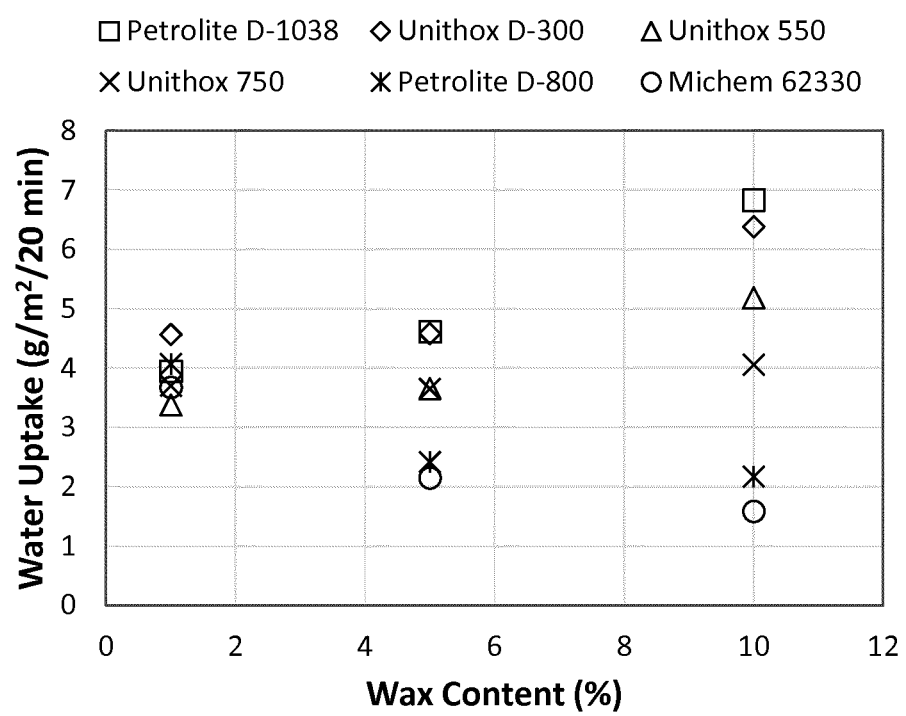
FIG. 3 shows water uptake dependence versus amount of hydrophobic emulsion additive for exemplary polymer binders.

Example 6. Assessment of Water Uptake for Multi-Phase Polymer Dispersions Containing Hydrophobic Emulsion Additives Water resistance of exemplary polymer binders containing hydrophobic emulsion additives was measured using the Cobb test. Exemplary water uptake data is shown in FIGS. 2 and 3 for a polymer binder containing (a) acid rich phase: 10.8 wt % MMA, 34.0 wt % styrene, 39.0 wt. % iBMA, 11.2 wt % MAA, 5 wt % IOMPA; (b) acid free phase: 30.0 wt % 2-EHA, 20.0 wt % styrene, 30.0 wt % nBA, 20 wt % iBMA; and (c) a hydrophobic emulsion additive. The data demonstrates the water uptake dependence upon the type of hydrophobic emulsion additive. For example, JONCRYL® Wax 120 (paraffin/polyethylene wax emulsion), PETROLITE™ D-800 (paraffin wax emulsion, dispersed using an ethoxylated hydrocarbon surfactant), and MICHEM® 62330 (anionic paraffin/polyethylene emulsion) provided the largest increase in water resistance. Additionally, the data indicated that the amount of hydrophobic emulsion additive was critical. In the cases of PETROLITE™ D-1038, JONCRYL® Wax 26, UNITHOX™ D-300, UNITHOX™ D-550, and UNITHOX™ 750, water uptake increased with increasing additive content. However, water uptake decreased when MICHEM® 62330 or PETROLITE™ D-800 was used in amounts of up to 10 wt %. A maximum performance boost was found between 5 wt % and 10 wt % in the case of JONCRYL® Wax 120.

Further testing suggested that how the hydrophobic emulsion additive was incorporated into the formulation was important to polymer binder stability. For instance, JONCRYL® Wax 120 was added to the polymerization process in the initial reactor charge, between the polymerization of the acid-rich and acid-free phases, after the acid-free polymerization but before cool down or during cool down while above ambient temperature or as an additive after reactor discharge or after product filtration.

Example 7. Assessment of Over-Printability

The type of hydrophobic emulsion additive was found to have an impact on over-printability. Over-printability was determined by applying a hydrophobically modified formula (hydrophobic emulsion additives at 10% based on polymer solids; polymer binder containing (a) acid-rich phase: 10.8 wt % MMA, 34.0 wt % styrene, 39.0 wt. % iBMA, 11.2 wt % MAA, 5 wt % IOMPA; and (b) acid-free phase: 30.0 wt % 2-EHA, 20.0 wt % styrene, 30.0 wt % nBA, 20 wt % iBMA) to a specified paper stock using a wire wound rod, an anilox hand proofer or a mini-Geiger press. An ink formulation (41.0 wt % Pigment Dispersion BFD1121 Blue, 10.0 wt % JONCRYL® 60, 44.0 wt % JONCRYL® 89 and 5.0 wt % JONCRYL® wax 26) was then applied over the coated papers using an anilox roller with a 4.5 BCM volume. The color strength (color density) was then measured by a color densitometer. The color density is directly related to the over-printability, in that the more ink that is transferred and adheres to the hydrophobic coating, the greater the color strength. Exemplary data are shown in FIG. 4.

Figure 4:
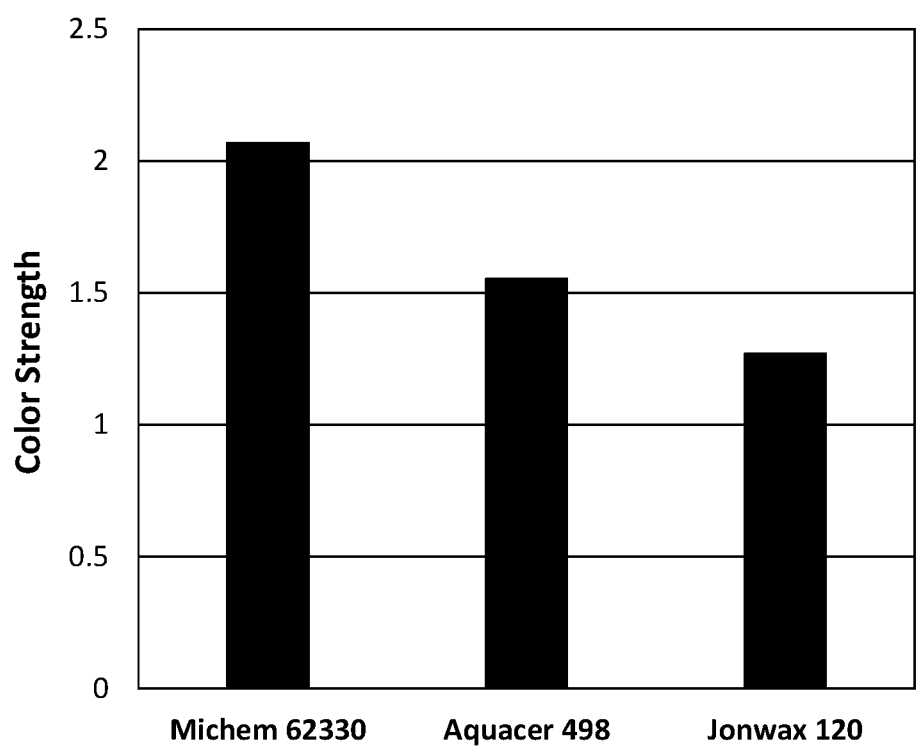
FIG. 4 shows over-printability of exemplary polymer binders containing a hydrophobic emulsion.
Figure 5:
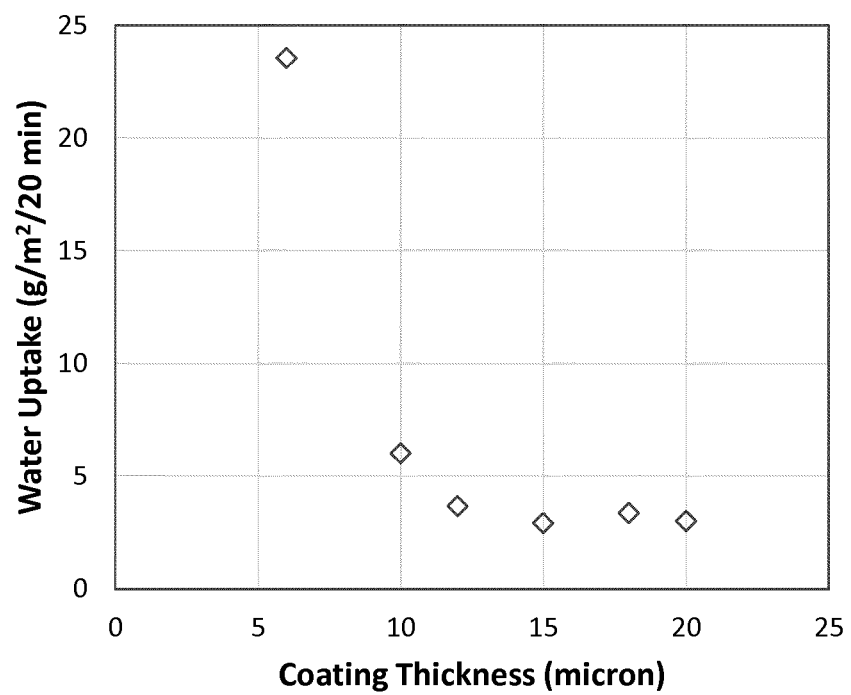
FIG. 5 shows water uptake dependence versus coating film thickness using an exemplary binder.

FIG. 4 demonstrates that the type of hydrophobic emulsion additive has a significant impact on over-printability. Over-printability is an important property because it allows multiple coating layers to be applied so that the desired film thickness can be achieved along with the target water uptake, block resistance and heat seal strength. The target coating thickness was determined to be 10<x<20 microns (as shown in FIG. 5), a thickness that cannot be achieved using flexographic or gravure printing techniques in one coating layer.

Example 8. Assessment of Block Resistance

Figure 6:
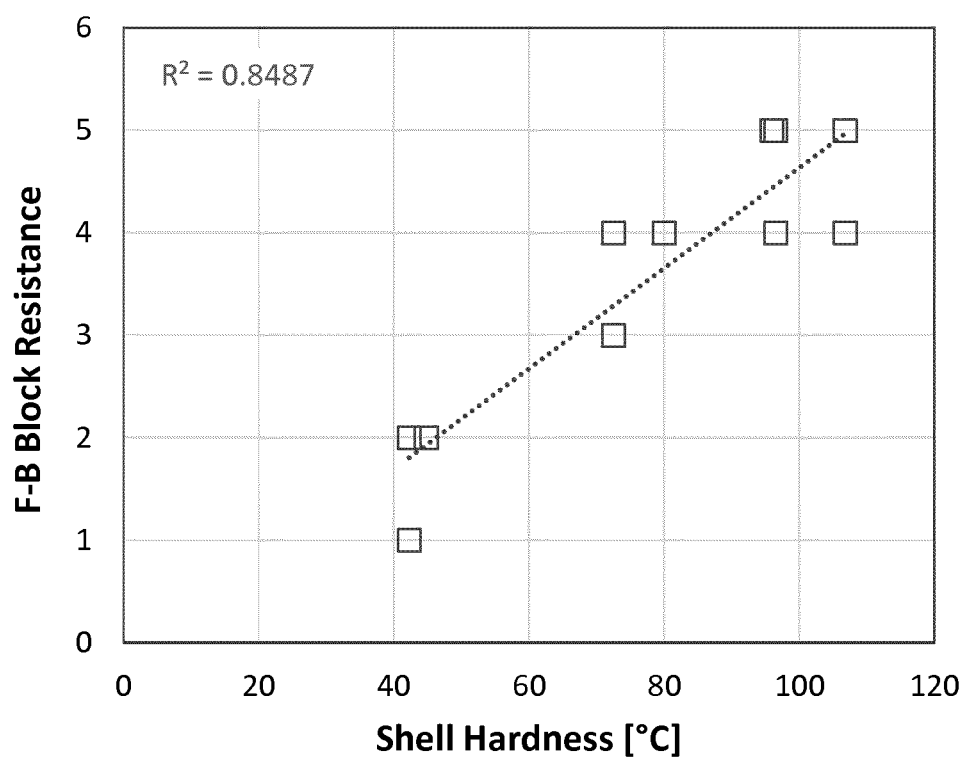
FIG. 6 shows block resistance versus shell phase hardness for exemplary binders. F-B Block indicates block resistance between coated (F) and uncoated (B) paper stock. The R$^2$ value indicates the shell hardness describes 85% of the data variation.
Figure 7:
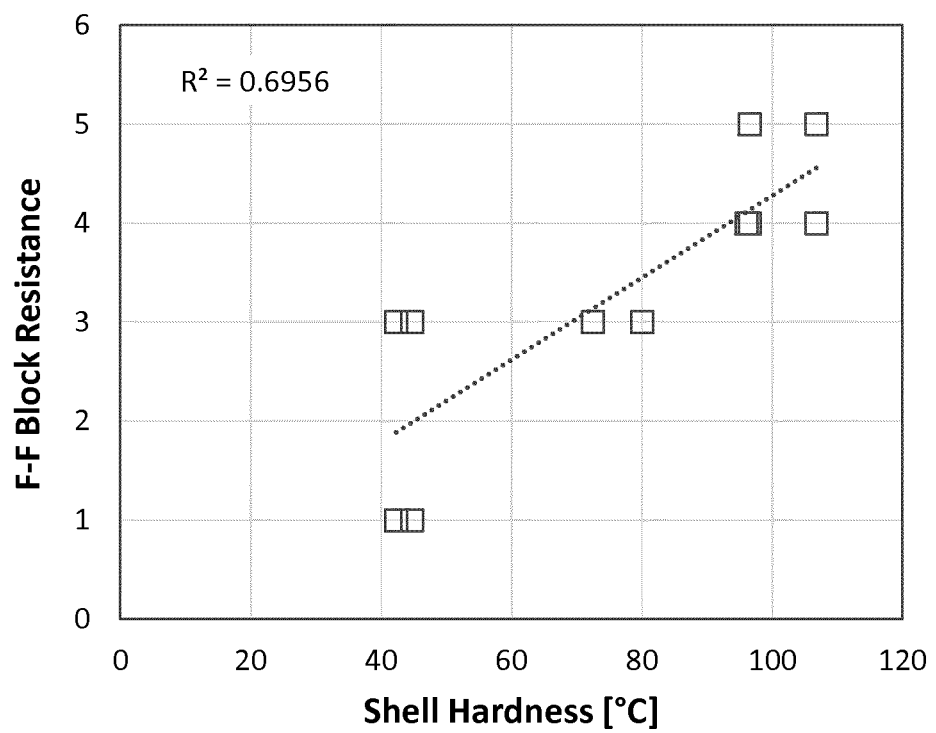
FIG. 7 shows block resistance versus shell phase hardness for exemplary binders. F-F Block indicates block resistance between coated (F) paper stock. The R$^2$ value indicates the shell hardness describes 70% of the data variation.

Block resistance tests were carried out to determine the resistance of the polymer binder to stick to itself and uncoated paper under pressure and at elevated temperatures. The tests measure the extent of tackiness and damage that a coated substrate experiences when subjected to standard temperature, pressure, and time. Rolls of coated paper stock can achieve an internal pressure of up to 60 psi, depending on paper uniformity. When stored or transported under tropical conditions (30° C. and 95% relative humidity), coated paper layers can stick together, and, in the worst case scenario, the paper or coating can be significantly damaged. Block resistance tests were performed at 50° C. and 60 psi for 24 hours. Samples were cut 1×3 inches and two sheets were layered coating-to-paper (face-to-back, F-B) or coating-to-coating (face-to-face, F-F) in a block testing apparatus. A spring was then placed on top of the layers to apply a certain amount of pressure on the samples. The entire apparatus was placed in an oven capable of humid conditions at 50° C. for 24 hours. When the block test was completed, the samples were removed and monitored for tack and damage of samples. The rating system is described in Table 6. Polymer binder compositions are shown in Table 4. Exemplary block resistance data are shown in Table 7 and FIGS. 6 and 7. The data shows the dependence of block resistance on the acid-rich polymer hardness.

TABLE 6

Rating system for block resistance tests.

| Rating | Explanation |
| --- | --- |
| 5-No Blocking | No adhesion or cohesion (no tack between the two sheets). Sheets slide or peel freely from one another with no paper substrate damage. |
| 4-Slight Cling | Slight ticking can be heard as the samples are peeled (slight tack between the two sheets). No visible distortion and no paper substrate damage. |
| 3-Cling | Noticeable adhesion between adjacent surfaces (significant tack between the two sheets) & visual distortion of the surfaces. No distortion of webs or offset printing inks or lacquers, no paper substrate damage. |
| 2-Slight Blocking | Slight adhesion. Adjacent surfaces do not separate freely, but will with frictional slide or peel pressure. Surface of specimen may show slight distortion. Less than 50% paper substrate damage. |
| 1-Considerable Blocking | Adhesion or cohesion of contiguous surfaces. Layers may be separated with difficulty. Surfaces will be distorted. More than 50% paper substrate damage. |
| 0-Complete | Blocking to the extent of a complete seal or weld between adjacent Blocking surfaces which cannot be separated without destruction of the test specimen. |

TABLE 7

Multi-phase polymer binder block resistance.

| | | Hardness | Block Resistance | |
| --- | --- | --- | --- | --- |
| I.D. | Polarity | (° C.) | F-F | F-B |
| 1 | 0.177 | 42.0 | 4 | 4 |
| 3 | 0.218 | −10.6 | 3 | 2 |
| 4 | 0.194 | 16.7 | 3 | 4 |
| 5 | 0.198 | 6.5 | 5 | 5 |
| 6 | 0.197 | 20.5 | 1 | 2 |
| 7 | 0.218 | 38.7 | 4 | 4 |
| 8 | 0.230 | −11.5 | 3 | 2 |
| 9 | 0.209 | 19.4 | 1 | 1 |
| 10 | 0.239 | 3.8 | 5 | 5 |
| 15 | 0.184 | 21.6 | 4 | 5 |
| 16 | 0.173 | 18.0 | 3 | 4 |

Example 9. Assessment of Heat Seal Strength and Block Resistance

A semi-automatic heat sealer was used to seal samples according to ASTM F2029 at certain temperatures, pressures, and sealing times (e.g., 1 second dwell time, 40 psi, 125-250° C.). The samples were cut 1×4 inches and sealed coating-to-paper. An Instron testing machine was used to perform a 180° peel test according to a modified ASTM D3330 test method on the heat sealed samples. Seal strength, failure mode, and hot tack performance (measured at high temperatures) was determined. The coated samples were conditioned in a controlled temperature and humidity (CTH) room for 24 hours and consequently tested at −15° C., 25° C., and 90° C. Peel strength (or seal strength) as reported (N/mm) was the maximum strength achieved under the testing conditions. Failure modes can be adhesive (coating and paper separate, no seal) or substrate (paper tear).

Table 8 displays property details, coating block resistance and heat seal strength data for a multi-phase polymer binder consisting of (a) an acid-rich phase of MMA 47%, 2-EHA 5%, STY 36%, MAA 12% (molecular weight was controlled using isooctyl mercaptopropionate between 0.5 and 5.0%); (b) an acid-free phase of BA 30%, 2-EHA 30%, STY 20%, iBMA 20%; and (c) MICHEM® 62330 at 10 weight percent based on solids content. The data in Table 8 shows the negative impact of DISPONIL® AFX 1080 on block resistance (I.D. No. 17 vs. 18), but positive impact on heat seal strength at room (I.D. No. 17 vs. 18) and elevated temperatures (I.D. No. 20 vs. 21). Acid-rich phase molecular weight was found to positively impact block resistance (I.D. No. 17 vs. 20), but negatively impact room temperature heat seal strength (I.D. No. 17 vs. 20). The same trend was found for acid-rich phase content and block resistance and room temperature heat seal strength (I.D. No. 18 vs. 19). By optimizing polymer dispersion composition and the amount of processing additive, it was possible to obtain a very good balance of block resistance, heat sealability and heat seal strength at 25° C. and 90° C. For example, 40 wt % shell phase, between 1 and 3 wt % DISPONIL® AFX 4070, and a shell phase molecular weight between 45,000 and 60,000 and a $T_g$ between 100° C. and 120° C. provided excellent block resistance and heat seal strength at 25° C. and 90° C., at typical heat seal temperatures (between 150° C. and 250° C.). Deviating from these levels significantly reduced performance.

Additionally, modifying the structure of the processing additive and changing its polarity affects this balance of properties. For example, reducing the degree of ethoxylation, from 40 to 10 molar ethylene oxide units, increases block resistance, but heat seal strength at 25° C. is reduced.

Figure 8:
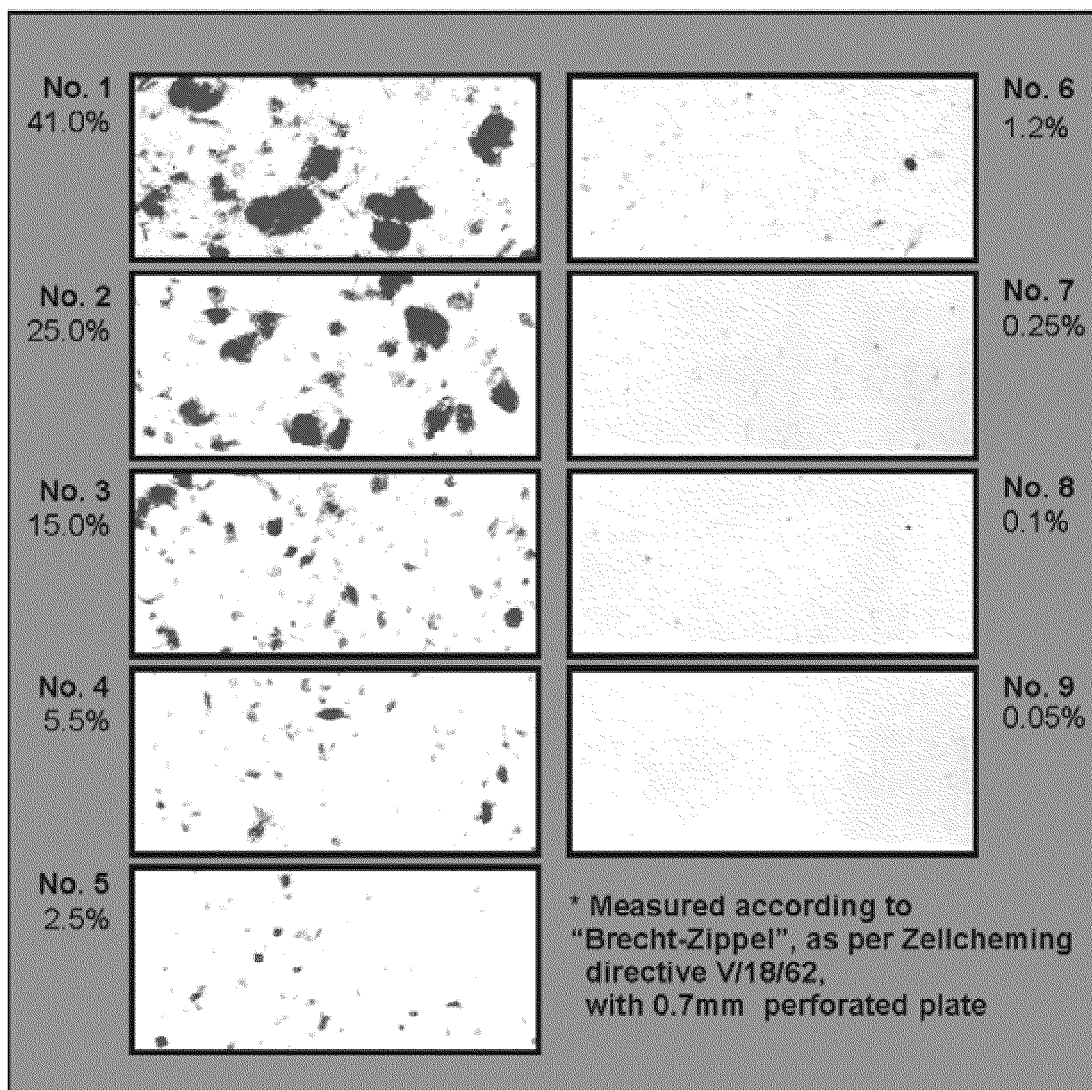
FIG. 8 shows a Voith Speck Index (VSI) chart for identifying defibering/repulpability of coated paper stocks.
Figure 9:
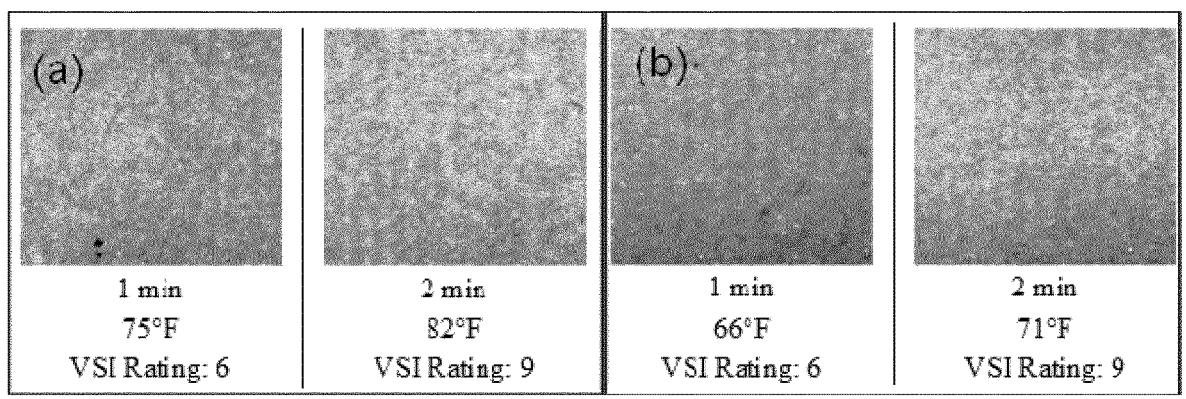
FIG. 9 shows (a) hand sheets from repulped blank paper; and (b) handsheets from repulped coated paper cup stocks.

R.H.). The coated samples were then tested for repulpability using cold tap water and a 4 liter multistage lab blender. Blending was conducted for a specific period of time (1-6 minutes) and different blending speeds. The defibering behavior of the coated papers was measured using two methods. In the first method, a portion of the pulp was added to a 1 liter graduated cylinder of water and its appearance was compared to a Voith Speck Index (VSI) chart (FIG. 8). In the second method, 75 gsm hand sheets were made, pictures were taken under microscope and compared to the VSI chart to establish the degree of defibering. The VSI rating was dependent on the amount of speckles and large fibers/coatings. FIG. 9 shows pictures of hand sheets made from pulps from an uncoated blank and a coated paper stock, respectively. As shown, there was no significant difference between the two hand sheets with low speckle counts after 2 minutes of repulping, confirming that the coating does not negatively affect the recyclability or repulpability of the paper stock.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle

TABLE 8

Multi-phase polymer binder block resistance and heat seal strength results.

| | | | | | Block Resistance | | Seal Strength (N/m, 25° C.) | | | Seal Strength (N/m, 90° C.) | |
| --- | --- | --- | --- | --- | --- | --- | --- | --- | --- | --- | --- |
| I.D. No. | P1 $T_g$ (° C.) | P1 $M_w$ | P1 (%) | Surfactant | F-F | F-B | 125° C.* | 150° C.* | 200° C.* | 150° C.* | 250° C.* |
| 17 | 88.9 | 11,400 | 40.0% | n | 4 | 4 | 0 | 220 | 510 | 2.0 | — |
| 18 | 88.9 | 11,400 | 40.0% | y | 2 | 2 | 395 | 419 | 643 | 0.0 | — |
| 19 | 88.9 | 11,400 | 60.0% | n | 5 | 5 | 0 | 0 | 60 | — | — |
| 20 | 118.3 | 47,900 | 40.0% | n | 4 | 5 | 0 | 0 | 16 | — | — |
| 21 | 118.3 | 47,900 | 40.0% | y | 4.3 | 4.3 | 73.9 | 357.9 | 451.1 | — | 207.0 |

Abbreviations:
P1: acid-rich polymer phase;
Tg: glass transition temperature (° C.);
Mw: acid-rich phase weight average molecular weight;
Surfactant DISPONIL ® AFX 1080 (non-ionic surfactant);
F-F: block resistance tested coating to coating;
F-B: block resistance tested coating to uncoated paper
*Seal strength measured and 25° C. and 90° C. Heat seals prepared at 125° C., 150° C., 200° C. and 250° C.

Example 10. Assessment of Coated Article Recyclability/Repulpability

A repulpability assessment employing laboratory scale repulping equipment was conducted to identify recyclability/repulpability of a specified coated paper cup stock (300 grams). The assessment consisted of applying a variety of hydrophobically modified formulas using an automated wire wound coater using a #0 rod. Rod coating utilized wired bars and an automated control coater. The film coat weight on the paperboard was controlled by the groove size (10-20 grams per square meters (gsm)). The coat weights varied between 12-16 gsm. The coated samples were conditioned overnight at standard laboratory conditions (72° F.±5° F., 50%±5% third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A multi-phase polymer binder consisting essentially of:
    an aqueous polymer dispersion present in an amount of at least about 65 wt %;
    a hydrophobic emulsion from 5 wt % to about 10 wt %; and
    a surfactant from 1 wt % to about 3 wt %;
    wherein:
    the polymer binder, when dried, provides a water uptake of less than about 5 g/m²/20 min, a seal strength of at least about 200 Newton/meter (N/m) as measured at 25° C. or at 90° C., and sufficient block resistance to impart no substrate damage; and
    the aqueous polymer dispersion consisting essentially of:
    an acid-rich copolymer consisting essentially of polymerized carboxylic acid functional monomers, styrene monomers, and (meth)acrylate monomers; and
    an acid-free copolymer.

2. The multi-phase polymer binder of claim 1, wherein the acid-free copolymer consists essentially of polymerized styrene monomers and (meth)acrylate monomers.

3. The multi-phase polymer binder of claim 2, wherein the acid-free copolymer consists essentially of 15 wt % to about 40 wt % of the styrene monomers and about 65 wt % to about 85 wt % of the (meth)acrylate monomers.

4. The multi-phase polymer binder of claim 1, wherein the aqueous polymer dispersion is present in an amount of at least about 80 wt %.

5. The multi-phase polymer binder of claim 1, wherein the acid-rich copolymer is present in an amount of about 1 wt % to about 60 wt %; and the acid-free copolymer is present in an amount of about 40 wt % to about 95 wt %.

6. The multi-phase polymer binder of claim 1, wherein the acid-rich copolymer consists essentially of about 5 wt % to about 25 wt % of the carboxylic acid functional monomers;
    up to about 70 wt % of the styrene monomers; and about 10 wt % to about 90 wt % of the (meth)acrylate monomers.

7. The multi-phase polymer binder of claim 1, wherein the acid-free copolymer consists essentially of 15 wt % to about 40 wt % of the styrene monomers and about 65 wt % to about 85 wt % of the (meth)acrylate monomers.

8. The multi-phase polymer binder of claim 1, wherein the hydrophobic emulsion is a wax emulsion.

9. The multi-phase polymer binder of claim 8, wherein the wax emulsion comprises paraffin, polyethylene, polypropylene, microcrystalline waxes, fluorinated waxes, ethylene and propylene copolymer waxes, or any combination of two or more thereof.

10. The multi-phase polymer binder of claim 1, wherein the surfactant is anionic or non-ionic.

11. The multi-phase polymer binder of claim 1, wherein the surfactant consists essentially of one or more alkyl sulfonates, alkyl benzene sulfonates, alkyl sulfates, alkyl benzene sulfates, phosphates, phosphinates, fatty carboxylates, or any combination of two or more thereof.

12. The multi-phase polymer binder of claim 1, wherein the surfactant consists essentially of one or more fatty alcohol ethoxylates, one or more alkylsulfosuccinate ethoxylates, or a combination thereof.

13. The multi-phase polymer binder of claim 1, wherein the surfactant consists essentially of:
    one or more fatty alcohols having an alkyl chain length of about 12 to about 18 carbons; and
    a degree of ethoxylation of about 10 to about 80 molar ethylene oxide units.

14. A substrate comprising at least one surface coated with at least one layer comprising a multi-phase polymer binder of claim 1.

15. The substrate of claim 14, wherein the substrate is paper or paperboard.

16. A process for making the multi-phase polymer binder of claim 1, wherein the aqueous polymer dispersion comprises an acid-rich copolymer and an acid-free copolymer and the acid-free copolymer is prepared in the presence of the acid-rich copolymer or the aqueous polymer dispersion is prepared using a free radical emulsion polymerization process.

* * * * *